March 6, 1951
R. A. BRADEN
2,544,293
FREQUENCY-MODULATED RADAR SYSTEM
OF SUPERHETERODYNE TYPE
Filed April 1, 1949
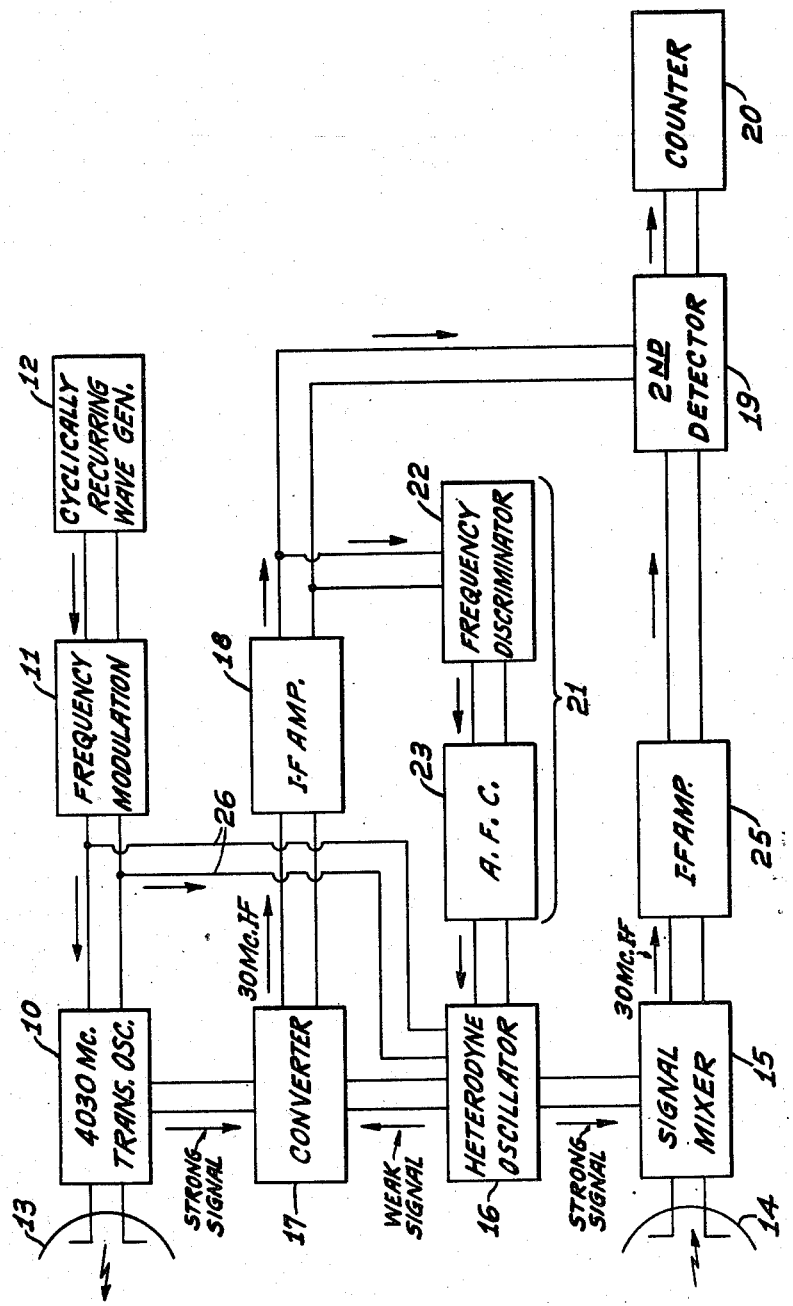
INVENTOR
RENE A. BRADEN
BY
ATTORNEY Patented Mar. 6, 1951

2,544,293

UNITED STATES PATENT OFFICE 2,544,293

FREQUENCY-MODULATED RADAR SYSTEM OF SUPERHETERODYNE TYPE

René A. Braden, Hopewell, N. J., assignor to Radio Corporation of America, a corporation of Delaware Application April 1, 1949, Serial No. 84,906

4 Claims. (Cl. 343—14)

1

This invention relates generally to a radar system and more particularly to such systems that operate on the superheterodyne principle. In such systems the frequency of the transmitted energy is varied continuously and periodically over a determined frequency band, the difference between the reflected signal frequency and the transmitter frequency is resolved and such difference is a measure of the distance between the system and the reflecting surface.

When the superheterodyne principle is employed in systems which depend for their accuracy upon the accurate measurement of frequency differences, preferably arrangements are made to overcome the frequency drift of both the transmitter oscillator and the heterodyne oscillator as well as to narrow the width of the band-pass of the I. F. amplifiers to the extent that good selectivity is ensured.

It has heretofore been suggested that the aforementioned difficulties may be obviated in superheterodyne systems by incorporating into the system an automatic frequency control device which may consist of a frequency discriminator and a reactance tube controlled by the output of the discriminator. The signal from the automatic frequency control device is applied to the heterodyne oscillator to obtain the desired control. A system incorporating such controls is described and claimed in United States Patent No. 2,424,796 to Carlson, issued July 29, 1947.

The systems covered by that patent are essentially comprised of a transmitting means, the output of which is cyclically frequency-modulated, and a receiver component amplifier for the received reflected signals and a local heterodyne oscillator which supplies a heterodyning signal to both (1) a converter, into which is also fed a signal directly from the transmitter, and (2) to a signal mixer to which is also supplied the reflected received signal. Thus, the transmitter signals and the received signals are separately heterodyned to two intermediate-frequencies. Separate I. F. amplifiers are provided and the outputs of the I. F. amplifiers are applied to a second detector, which functions to produce a beat-frequency signal. This beat-frequency represents the propagation time of the reflected signal and is thus a function of the distance between the system and the reflecting surface. The output signal of one of the intermediate frequency amplifiers is applied to an automatic frequency control device which in turn is connected to the heterodyne oscillator and thus operates to control the oscillator frequency

2 in a manner to be described in more detail below. One of the effects of the foregoing arrangement is to synchronously change the frequency of the heterodyne oscillator to follow the changes in transmitter-frequency modulation and thus reduce the frequency modulation presented to the I. F. amplifiers as compared to the frequency deviation at the input of the signal mixer, whereby the band-width occupied by the I. F. signal is substantially reduced.

It has been observed, however, that when carrier frequencies above about 2,000 megacycles are employed, the system described in said patent will not operate to correct fully the errors introduced as a result of slight deviations of the heterodyne oscillator frequency from the frequency variation required to make the heterodyne oscillator exactly track the frequency deviation of the transmitter. With frequencies above about 2,000 megacycles further difficulties are encountered as a result of amplitude modulation, including noise, when the automatic frequency control circuit is controlled by the output of the reflected signal I. F. amplifier. In this instance, the operation of the automatic frequency control circuit is interrupted during periods when no reflected signal is being picked up by the receiver. When a reflected signal is subsequently received a material frequency drift may have developed in the interim and a period of time elapses before precise operation is restored by the automatic frequency control circuit.

The principal object of this invention is to provide a method and means whereby the difficulties experienced in the operation of a system of the type described with a carrier frequency above about 2,000 megacycles are obviated.

A particular object of this invention is to provide a method and means whereby the band-width occupied by the frequency deviation of the intermediate frequency signals and the pass-band of the frequency discriminator are reduced.

A further object is to provide a system in which an automatic frequency control operates independently of the circuits of the receiver component of the system and operates during the entire period of use of the system irrespective of whether signals are being received by the receiver component of the system.

Further objects and advantages of the invention will be apparent from the following detailed description made with reference to the accompanying drawing.

In the drawing the figure is a block diagram illustrating a radar or radio altimeter system that embodies the instant invention and illustrates the manner in which the local oscillator is cyclically frequency-modulated synchronously with the transmitter.

In the system illustrated, by way of example, the high frequency transmitter 10, which may be a magnetron, is cyclically frequency-modulated in the ordinary manner by the modulating unit 11 which may, for example, be a variable capacity or a reactance type modulator. The modulator 11 is controlled by a cyclically recurring wave which is produced by the high frequency wave generator 12. The cyclically modulated high frequency wave thus produced is broadcast in the direction of a reflecting surface by the transmitter antenna 13.

In the following description, it will be assumed for purposes of illustration that the mid-frequency of the transmitter oscillator 10 is 4030 megacycles and that frequency deviation produced by the modulator 11 is 2 megacycles.

The transmitter signal reflected by a distant surface is picked up by the receiver antenna 14 and fed to the signal mixer 15. A heterodyne local oscillator 16 supplies a heterodyning signal, which will be assumed to be 4,000 megacycles, to the signal mixer 15 where the heterodyning signal beats with the reflected signal to produce a first I. F. signal. This I. F. signal is applied to the intermediate frequency amplifier 25. The local oscillator 16, which may be a reflex Klystron, also supplies a heterodyning signal to the converter 17 where this signal beats with the signal supplied directly from the transmitter oscillator 10 to produce a second I. F. frequency signal which is then amplified in the I. F. amplifier 18.

Optimum operating conditions are obtained when a strong frequency-modulated signal is applied to the converter 17 from the transmitter oscillator and a weak signal from the heterodyne oscillator 16 to the converter. The I. F. signal thus obtained is substantially free from any amplitude modulation even though there may be undesired amplitude modulation on the strong signal. A strong signal is supplied to the signal mixer 15 by the heterodyne oscillator.

The outputs of the I. F. amplifiers 18 and 25 are applied to the second detector 19 where they combine to produce a beat-frequency signal. The frequency of this signal is a function of the propagation time of the transmitted wave from the system to the reflecting surface and back to the receiving antenna 14. The beat-frequency thus obtained is substantially free from amplitude modulation effects and is applied to the counter 20 or to a similar device that will translate the frequency difference to a "distance" indication.

Frequency control of the heterodyne oscillator 16 is obtained by means of the automatic frequency control device 21 which comprises the frequency discriminator 22 and the automatic frequency control circuit 23, which may be a reactance tube. The output of the device 21 is applied to the heterodyne oscillator 16 and serves to correct frequency drifts of the oscillators. The frequency discriminator 22 may be the type described in United States Patent No. 2,121,103 to Seeley, issued June 21, 1928. The output of the discriminator will have either a positive or negative polarity depending on the direction of the deviation from the mid-frequency of the discriminator, which in this instance is 30 megacycles. This output is applied to the automatic frequency control circuit 23, which may be a direct-current amplifier or similar circuit, in which circuit is developed a D.-C. voltage which may be applied to the reflector circuit of the reflex Klystron to provide frequency adjustments of the oscillator. It will be noted that any shift in the frequency of the heterodyne oscillator will cause identical changes in both the converter 17 and the signal mixer 15, and will not therefore disturb the frequency comparison made by the second detector 19, the output of which is representative of the propagation time of the transmitted and received pulse, and consequently representative of the distance between the system and the reflecting surface.

In the instant invention, the local oscillator 16 is frequency-modulated by the modulator 11 synchronously with transmitter oscillator 10. The output of the frequency modulator, which is applied to the heterodyne oscillator, is supplied through the connection 26 which directly supplies the modulating signal to the heterodyne oscillator. Thus arranged, the voltages applied to the transmitter oscillator and the heterodyne oscillator are adjusted so that each oscillator sweeps over the same frequency range, separated in frequency only by the amount of the I. F., which in this instance is 30 megacycles. The time constant of the frequency discriminator 22 is selected so that the automatic frequency control device is responsive not only to the drift of the oscillators from their mid-frequency, but also to the deviation of the heterodyne oscillator from exact tracking of the frequency modulation deviation of the transmitter oscillator 10. The discriminator is, however, by-passed with sufficient capacity so that it will not respond to the higher rates of change of frequency which would correspond to the useful beat-notes. Accordingly, the direct control of the frequency output of the heterodyne oscillator by frequency modulation synchronously with the frequency modulation of the transmitter oscillator results in narrowing the band-width of the I. F. signals to the extent that the frequency modulation deviation presented to the I. F. amplifiers is substantially less than that at the input to the mixer 15. Furthermore, the response range of the automatic frequency control device may be reduced to the extent necessary to accommodate only drift control as compared to that necessary for both frequency modulation deviation and drift control.

Undesired amplitude modulation effects are avoided and continuous control of the oscillator frequency as well as exact tracking between the oscillators is obtained by establishing the automatic frequency control device in a circuit which is wholly independent of the mixer 15 and the intermediate frequency amplifier 25 of the receiver component of the system. Thus arranged, the frequency control will be independent of the operation of the I. F. amplifier 25 which would otherwise develop a signal only in the event that a reflected wave was being received by the receiver antenna 14. Furthermore, the amplitude modulation effects of noise, which may be present on signals obtained from the receiver component of the system and which may cause a phase shift in the signal that would appear as a frequency change in the I. F. amplifier, are avoided.

What is claimed is:

1. A radio distance determining system comprising: transmitting means for transmitting a cyclically frequency modulated radio signal to a wave reflecting surface, means for receiving said signal after it has been reflected from said reflecting surface, a mixer and a converter, means including an oscillator and said mixer for heterodyning said reflected signal to an intermediate-frequency signal, means including said oscillator and said converter for heterodyning a signal transmitted directly from the transmitter to an intermediate-frequency signal, separate amplifying means for amplifying the respective intermediate-frequency signals, a second detector to which the intermediate-frequency signals are applied for producing a beat-frequency signal, a frequency discriminator to which the said transmitter intermediate-frequency signal is applied, an automatic-frequency-control means for said oscillator to which means the output of said discriminator is applied, and additional means for frequency-modulating said oscillator synchronously with the frequency modulation of said transmitter for reducing the frequency band width occupied by said intermediate-frequency signals.

2. A radio distance determining system comprising: transmitting means for transmitting a radio signal to a wave reflecting surface, a cyclic frequency modulator means connected to said transmitter for cyclically frequency modulating said transmitter signal, means for receiving said signal reflected from said wave reflecting surface, a mixer and a converter, means including a local heterodyne oscillator and said mixer for heterodyning said reflected signal to an intermediate-frequency signal, means including said oscillator and said converter for heterodyning a signal transmitted directly from the transmitter to an intermediate-frequency signal, separate amplifying means for amplifying the respective intermediate-frequency signals, a second detector to which the intermediate-frequency signals are applied for producing a beat-frequency signal, a frequency discriminator to which the transmitter intermediate-frequency-signal is applied, an automatic-frequency-control means connected to said oscillator to which means the output of said discriminator is applied, and connections between the said cyclic frequency modulator means and said oscillator for applying the output signal of the said frequency modulator means directly to said oscillator.

3. A radio distance determining system comprising: transmitting means for transmitting a cyclically frequency modulated radio signal to a wave reflecting surface, means for receiving said signal after it has been reflected from said wave reflecting surface, a mixer and a converter, means for applying said reflected signal to said mixer, means for applying said radio signal directly from the transmitter to said converter with comparatively strong amplitude, a local heterodyne oscillator for supplying a heterodyning signal to said mixer with comparatively strong amplitude whereby said reflected signal is heterodyned to an intermediate-frequency and for applying the heterodyning signal with comparatively weak amplitude to said converter whereby the said transmitter signal is heterodyned to an intermediate-frequency, separate amplifying means for amplifying the respective intermediate-frequency signals, a second detector to which the intermediate-frequency signals are applied for producing a beat-frequency signal, a frequency discriminator to which the said transmitter intermediate-frequency signal is applied, an automatic-frequency-control means for said oscillator to which means the output of said discriminator is applied, and additional means for frequency-modulating said oscillator synchronously with the frequency modulation of said transmitter for reducing the frequency band width occupied by said intermediate-frequency signals.

4. A radio distance determining system comprising: transmitting means for transmitting a radio signal to a wave reflecting surface, a cyclic frequency modulator means connected to said transmitter for cyclically frequency modulating said transmitter signal, means for receiving said signal reflected from said wave reflecting surface, a mixer and a converter, means for applying said reflected signal to said mixer, means for applying said radio signal directly from the transmitter to said converter with comparatively strong amplitude, a local heterodyne oscillator for supplying a heterodyning signal to said mixer with comparatively strong amplitude whereby said reflected signal is heterodyned to an intermediate-frequency and for applying the heterodyning signal with comparatively weak amplitude to said converter whereby the said transmitter signal is heterodyned to an intermediate-frequency, separate amplifying means for amplifying the respective intermediate-frequency signals, a second detector to which the intermediate-frequency signals are applied for producing a beat-frequency signal, a frequency discriminator to which the transmitter intermediate-frequency-signal is applied, an automatic-frequency-control means connected to said oscillator to which means the output of said discriminator is applied, and means comprising connections between the said cyclic frequency modulator means and said oscillator for applying the output signal of the said frequency modulator means directly to said oscillator for frequency-modulating said oscillator synchronously with the frequency modulation of said transmitter.

RENÉ A. BRADEN.

REFERENCES CITED

The following references are of record in the file of this patent:

UNITED STATES PATENTS

| Number | Name | Date |
| --- | --- | --- |
| 2,424,796 | Carlson | July 29, 1947 |
| 2,475,176 | Yuan | July 5, 1949 |